United States Patent
Charley et al.

(10) Patent No.: US 6,756,843 B2
(45) Date of Patent: Jun. 29, 2004

(54) SIGNAL TRANSMITTER WITH PULSE-CONTROLLED AMPLIFICATION

(75) Inventors: Sylvain Charley, Caen (FR); Emmanuel Savin, Falaise (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/083,439

(22) Filed: Oct. 22, 2001

(65) Prior Publication Data

US 2002/0145469 A1 Oct. 10, 2002

(30) Foreign Application Priority Data

Oct. 24, 2000 (FR) .............................. 00 13622

(51) Int. Cl.[7] .............................. H03F 1/14; H03F 3/68
(52) U.S. Cl. ...................... 330/51; 330/124 R; 330/129
(58) Field of Search .............................. 330/51, 124 R, 330/129

(56) References Cited

U.S. PATENT DOCUMENTS

| | | | |
|---|---|---|---|
| 5,757,229 A | * | 5/1998 | Mitzlaff .................. 330/124 R |
| 5,926,013 A | | 7/1999 | Brandt ........................ 323/370 |
| 6,107,880 A | * | 8/2000 | Shaw .......................... 330/129 |
| 6,285,251 B1 | * | 9/2001 | Dent et al. ............... 330/124 R |
| 6,463,269 B2 | * | 10/2002 | DeMarco ................. 330/124 D |

FOREIGN PATENT DOCUMENTS

WO    WO9967893    6/1999    ............ H04B/1/40

* cited by examiner

*Primary Examiner*—Khanh Van Nguyen
(74) *Attorney, Agent, or Firm*—Aaron Waxler

(57) ABSTRACT

A transmitter of radioelectric signals includes a plurality of amplifiers PA1, PA2 for amplifying a signal Sin whose frequency is included in a predetermined frequency band, said signal Sin alternately carrying information and being in the quiescent state during first and second predetermined periods of time. The transmitter additionally includes a detector DET intended to supply a detection signal AP having active states and inactive states during the first and the second predetermined periods of time, respectively, and a controller CNT intended to supply signals S1 and S2, when the detection signal AP is in the active state, which signals are used to inhibit the amplifiers which are not optimized for the frequency band wherein the frequency of the signal Sin to be amplified is included.

6 Claims, 1 Drawing Sheet

SIGNAL TRANSMITTER WITH PULSE-CONTROLLED AMPLIFICATION

BACKGROUND OF THE INVENTION

The invention relates to a transmitter of radioelectric signals comprising a plurality of amplifiers, each amplifier being optimized to amplify a signal whose frequency is included in a predetermined frequency band, said signal alternately carrying information and being in the quiescent state during first and second predetermined periods of time.

An apparatus of this type, for example a radiotelephone, is capable of interacting with a plurality of communication networks, each one of these networks being designed to route signals whose frequency is in a frequency band that is generally predetermined by a standard.

The GSM standard, for example, includes a frequency band ranging from 880 to 915 MHz, while the DCS1800 standard includes a frequency band ranging from 1710 to 1795 MHz. Other standards, such as inter alia AMPS (acronym of Advanced Mobile Phone System) or PCS (acronym of Personal Communication System) include frequency bands that are centered around 800 and 190 MHz, respectively.

A transmitter capable of interacting with several networks, commonly referred to as multistandard, thus generates, dependent upon the network with which it is to communicate, a radio signal of adequate frequency, i.e. a frequency included in the frequency band covered by the corresponding standard. This radio signal is amplified by a power amplifier before it is transmitted by means of an antenna system.

It is known that an amplifier operates optimally in a given frequency band; for this reason, a transmitter capable of communicating with a plurality of communication networks generally comprises a number of power amplifiers, arranged in parallel upstream of the antenna system, which is equal to the number of networks capable of interacting with said apparatus.

When the apparatus is in the operating mode, the power amplifiers all receive the radio signal, but only one of said power amplifiers can supply an optimally amplified signal in the frequency band of the radio signal. Therefore, it is necessary to inhibit all the other power amplifiers. This is generally achieved by applying a negative voltage to the inputs of the amplifiers to be deactivated, thus enabling a permanent selection of the most suitable power amplifier, the negative voltages being applied throughout a period of time during which the apparatus must use a given communication network.

The known multistandard transmitters must thus comprise means for generating a continuous negative voltage. Two solutions are available for this purpose. A first solution consists in amplifying and rectifying a carrier of the radio signal. This solution, which is employed, for example, in the circuits MRFICO919 and MRFIC1819, marketed by Motorola, requires a complex and expensive circuitry, leading to a substantial increase of the cost price of the transmitter.

A second solution consists in employing a DC-DC converter, which is used as a negative voltage generator, as in the case of, for example, the Motorola circuits MC33169 and MC33170. However, such converters are noisy and require filtering of the signals they supply in order to preclude that said signals introduce parasitic rays into the radio signal. This type of filtering also requires the application of complex and expensive structures.

SUMMARY OF THE INVENTION

It is an object of the invention to overcome these drawbacks by providing a transmitter wherein the power amplifiers which are not optimized for the frequency band including the frequency of the radio signal can be inhibited without the generation of a continuous negative voltage.

In accordance with the invention, a transmitter in accordance with the opening paragraph comprises:
   detection means intended to supply a detection signal having active and inactive states during the first and the second predetermined periods of time, respectively, and
   control means intended to supply inhibition signals, when the detection signal is in the active state, which inhibition signals are intended to render those amplifiers inactive which are not optimized to execute an amplification in the frequency band wherein the frequency of the signal to be amplified is included.

In such a transmitter, the selection of the amplifier that is optimized to amplify the radio signal is not made permanently, but by means of pulses, i.e. only when the signal to be amplified effectively carries information. This means that it is not necessary to use a continuous negative voltage to inhibit the other amplifiers; instead a succession of pulses is used, which can be more readily generated, for example on the basis of the radio signal itself.

In one of the embodiments, the invention also relates to a generator of negative voltage pulses comprising an output terminal intended to produce said pulses, and an input terminal intended to receive a command signal intended to be periodically in an active state for a period of time that defines the duration of the pulses, which generator comprises a capacitive element, one terminal of which is connected to the output terminal of the generator, and another terminal of which is connected to first and second supply terminals via, respectively, a resistor and a main current path of a first transistor, the conduction of said first transistor being regulated by means of the command signal.

The invention more generally relates to a method of selecting an amplifier from a plurality of amplifiers, each one of said amplifiers being optimized to amplify a signal whose frequency is included in a predetermined frequency band with a view to amplifying a signal that alternates between carrying information and being in the quiescent state during first and second predetermined periods of time, which method includes an inhibition step, during the first period of time, thereby inhibiting those amplifiers which are not optimized to execute an amplification in the frequency band wherein the frequency of the signal to be amplified is included.

In an embodiment of this method, an amplifier will be advantageously inhibited by applying a negative voltage pulse to an input terminal of said amplifier, the duration of said pulse being equal to the predetermined first period of time.

BRIEF DESCRIPTION OF THE DRAWING

These and other aspects of the invention will be apparent from and elucidated with reference to the non-limitative exemplary embodiment and the annexed drawings, wherein.

DESCRIPTION OF THE PREFERRED EMBODIMENTS

Figure 1:
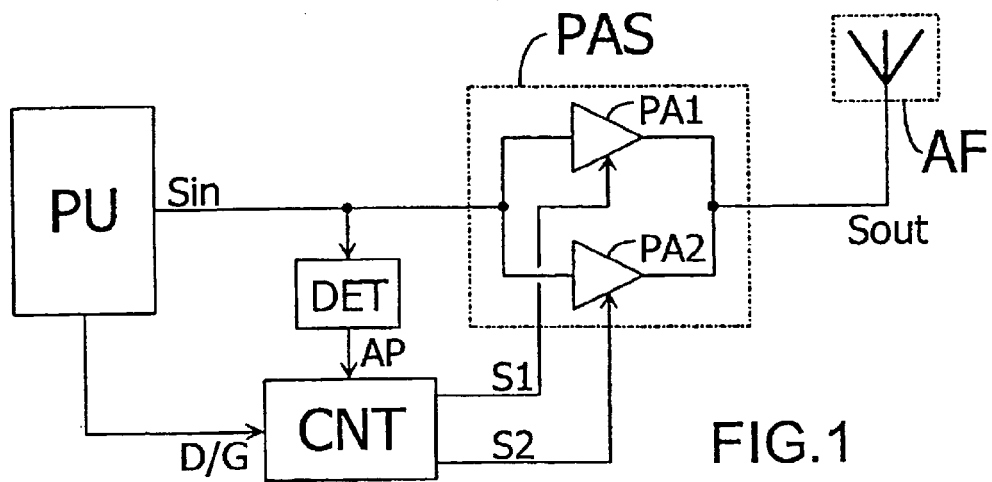
FIG. 1 is a part of a block diagram showing a signal transmitter in accordance with the invention.

FIG. 1 diagrammatically shows a device for transmitting radioelectric signals in accordance with a particular embodiment of the invention. This transmitter comprises an amplification stage PAS having two amplifiers PA1 and PA2, and is intended to amplify a signal Sin, commonly referred to as radio signal, before this signal is transmitted as a signal Sout by means of an antenna system AF. The radio signal Sin is generated by a processing unit PU and has a frequency which, in this example, will be included in a first or a second frequency band. By way of example, if the transmitter is capable of communicating with networks in accordance with the GSM and DCS 1800 standards, the first frequency band will range from 880 to 915 MHz, while the second frequency band will range from 1710 to 1795 MHz. The first and second amplifiers PA1 and PA2 are optimized so as to operate in the first and the second frequency bands, respectively.

In accordance with the above-mentioned standards, the radio signal Sin will alternate between carrying information and being in the quiescent state during first and second predetermined periods of time. By way of example, in accordance with the GSM standard, the first period of time has a duration of 0.57 ms, while the second period of time has a duration of 4.13 ms. The transmitter additionally comprises detection means DET intended to supply a detection signal AP having active and inactive states during the first and the second predetermined periods of time, respectively, i.e. the detection signal adopts, for example, logic level 1 when the radio signal Sin carries information, and logic level 0 if it does not carry information. In other embodiments in accordance with the invention, the detection means DET can be incorporated inside the processing unit PU.

The transmitter additionally comprises control means CNT intended to supply, when the detection signal AP is in the active mode, i.e. when the radio signal Sin caries information, inhibition signals S1 and S2 intended to render one of the first and second amplifiers PA1 and PA2 inactive, i.e. the amplifier that is not optimized to execute an amplification in the frequency band wherein the radio signal Sin is included.

In this example, the frequency band of the signal Sin is indicated by the state of a signal D/G supplied by the processing unit PU. Thus, if the signal D/G is at logic level 0, which indicates that the radio signal Sin is in accordance with the DCS 1800 standard, only the inhibition signal S1 can present negative pulses in order to inhibit the first amplifier PA1 intended to amplify signals in accordance with the GSM standard.

Conversely, if the signal D/G is at logic level 1, which indicates that the radio signal Sin is in accordance with the GSM standard, only the inhibition signal S2 can present negative pulses in order to inhibit the second amplifier PA2 intended to amplify signals in accordance with the DCS 1800 standard.

Figure 2:
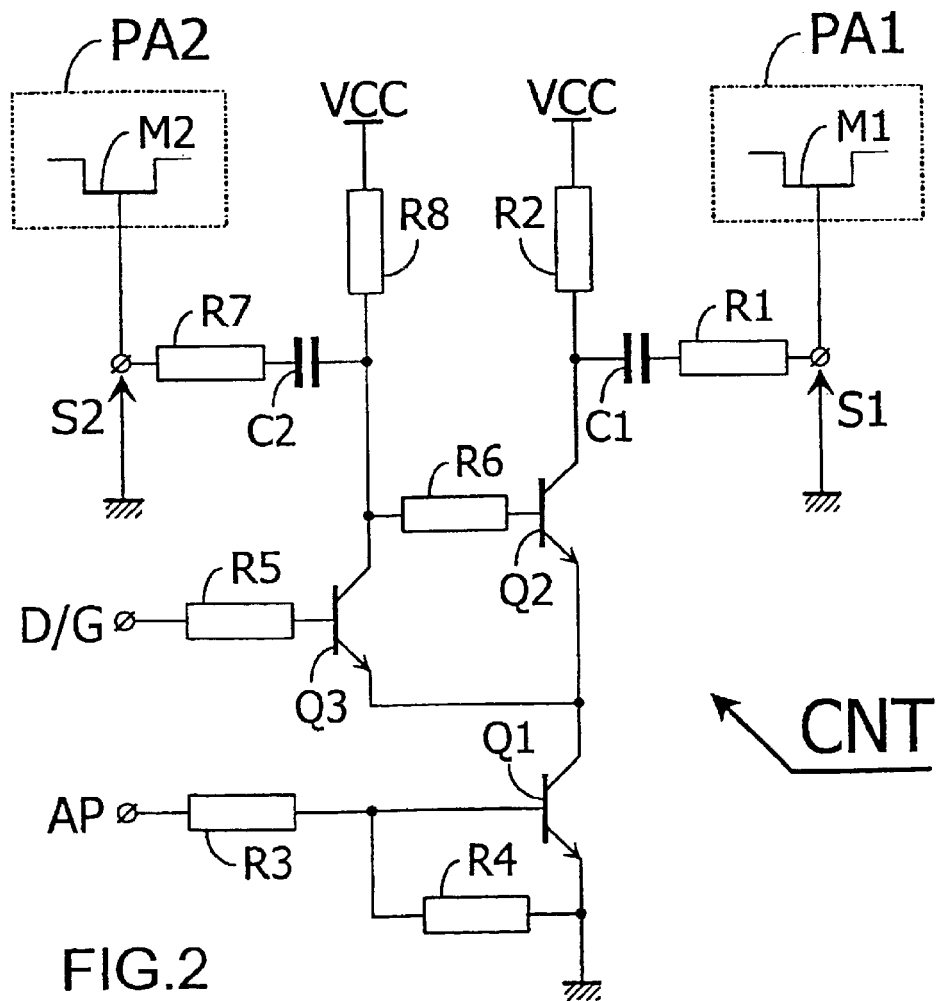
FIG. 2 is an electrical circuit diagram of an embodiment of the control means included in such a transmitter.

FIG. 2 is an electrical circuit diagram showing control means CNT in a preferred embodiment of the invention. These control means include two overlapping generators of negative voltage pulses, each generator comprising an output terminal intended to produce said pulses S1 or S2, and an input terminal intended to receive the detection signal AP. The pulses S1 or S2 will be applied to a polarizing terminal of at least one transistor M1 or M2 included in the power amplifier PA1 or PA2.

If the power amplifier is manufactured using MOS technology, then the polarizing terminal of a transistor is its gate. If the power amplifier is manufactured using bipolar technology, then the polarizing terminal of a transistor is its base.

Each generator comprises a capacitive element C1 or C2, a terminal of which is connected to the output terminal of said generator, and another terminal of which is connected to a first supply terminal VCC via a resistor R2 or R8 and to a ground of the circuit via a main current path of a first transistor Q1, the conduction of which is regulated by means of the detection signal AP.

Each generator of negative voltage pulses additionally comprises a second transistor, Q2 or Q3, whose main current path is arranged in series with that of the first transistor Q1, the conduction of said second transistor Q2 or Q3 being regulated by means of the selection signal D/G. This enables each generator to be deactivated, in the manner described hereinabove, when the frequency of the signal to be amplified is included in the frequency band for which the amplifier to which the output terminal of this generator is connected is optimized.

The control means function as follows:

If the selection signal D/G is at logic level 0, which indicates that the radio signal Sin is in accordance with the DCS 1800 standard, the second transistor Q3 of the first generator is blocked, whereas the second transistor Q2 of the first generator is in the on-state as its base is connected to the supply terminal VCC via two resistors R8 and R6.

As long as the detection signal AP is at logic level 0, the first transistor Q1 is blocked and the capacitive elements C1 and C2 of the first and the second generator are charged since they are connected to the supply terminal VCC via the resistors R2 and R8, respectively.

If, during the first period of time, the detection signal AP is at logic level 1, which indicates that the radio signal carries information, then the first transistor Q1 is conducting and the terminal of the capacitive element C1 of the first generator, which is not connected to the output terminal of said first amplifier, is connected to ground. The voltage that has been stored in said capacitive element C1 is now applied, in the reverse direction, to the output terminal of the first generator, thereby generating a negative voltage S1 and inhibiting the first amplifier PA1 intended to amplify radio signals in accordance with the GSM standard.

As the second transistor Q3 of the second generator is blocked, the capacitive element C2 of this generator remains connected to the supply terminal VCC, thereby avoiding the generation of a negative voltage S2.

When the detection signal AP becomes inactive again, i.e. during the second period of time, the first transistor Q1 becomes blocked and the capacitive element C1 of the first voltage generator is again connected to the supply terminal VCC. The inhibition signal S1 then returns to the quiescent state and will thus present a negative value throughout the first period of time.

Thus, when the selection signal D/G is at logic level 0, which indicates that the radio signal is in accordance with the DCS1800 standard, only the inhibition signal S1 can present negative pulses in order to inhibit the first amplifier PA1 intended to amplify signals in accordance with the GSM standard.

An explanation similar to that given hereinabove shows that when the selection signal D/G is at logic level 1, which means that the radio signal is in accordance with the GSM standard, only the inhibition signal S2 can present negative pulses to inhibit the second amplifier PA2 intended to amplify signals in accordance with the DCS1800 standard.

What is claimed is:

1. A transmitter of radioelectric signals comprising a plurality of amplifiers, each amplifier being optimized to amplify a signal whose frequency is included in a predetermined frequency band, said signal alternately carrying information and being in a quiescent state during first and second predetermined periods of time, said transmitter additionally comprising:

detection means intended to supply a detection signal having active and inactive states during the first and the second predetermined periods of time, respectively, and control means intended to supply inhibition signals, when the detection signal is in the active state, which inhibition signals are intended to render those amplifiers inactive which are not optimized to execute an amplification in the frequency band wherein the frequency of the signal to be amplified is included in the frequency band.

2. A transmitter of radioelectric signals as claimed in claim 1, wherein the inhibition signals are negative voltages intended to be applied to the polarization terminals of transistors included in the amplifiers.

3. A transmitter of radioelectric signals as claimed in claim 2, wherein the control means comprise a plurality of generators of negative voltage pulses, each generator having an output terminal intended to produce said pulses, and an input terminal intended to receive the detection signal, and each generator comprises a capacitive element, one terminal of which is connected to the output terminal of the generator, arid another terminal of which is connected to first and second supply terminals via a resistor and a main current path of a first transistor, respectively, the conduction of said first transistor being regulated by means of the detection signal, each generator being capable of being deactivated when the frequency of the signal to be amplified is included in the frequency band for which the amplifier, to which the output terminal of the generator is connected, is optimized.

4. A transmitter of radioelectric signals as claimed in claim 3, wherein each generator of negative voltage pulses additionally comprises a second transistor whose main current path is arranged in series with that of the first transistor, the conduction of said second transistor being regulated by means of a selection signal, said selection signal being in the active state when the frequency of the signal to be amplified is not included in the frequency band for which the amplifier, to which the output terminal of the generator is connected, is optimized, and said selection signal being in the inactive state in the opposite case.

5. A method of selecting an amplifier from a plurality of amplifiers, each one of said amplifiers being optimized to amplify a signal whose frequency is included in a predetermined frequency band with a view to amplifying a signal that alternates between carrying information and being in quiescent state during first and second predetermined periods of time, which method includes an inhibition step, during the first period of time, thereby inhibiting those amplifiers which are not optimized to execute an amplification in the frequency band wherein the frequency of the signal to be amplified is included in the frequency band.

6. A method as claimed in claim 5, wherein an amplifier is inhibited by applying a negative voltage pulse to an input terminal of said amplifier, the duration of said pulse being equal to the predetermined first period of time.

* * * * *